(12) United States Patent
Macken et al.

(10) Patent No.: US 9,607,640 B2
(45) Date of Patent: Mar. 28, 2017

(54) BOND PAD SHARING FOR POWERING A MULTIPLICITY OF ELECTRICAL COMPONENTS OF A RECORDING HEAD

(71) Applicant: Seagate Technology LLC, Cupertino, CA (US)

(72) Inventors: Declan Macken, Eden Prairie, MN (US); Jason Bryce Gadbois, Shakopee, MN (US); Timothy William Stoebe, Minnetonka, MN (US); Narayanan Ramakrishnan, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/812,041

(22) Filed: Jul. 29, 2015

(65) Prior Publication Data

US 2017/0032810 A1    Feb. 2, 2017

(51) Int. Cl.

| G11B 21/20 | (2006.01) |
|---|---|
| G11B 5/60 | (2006.01) |
| G11B 7/125 | (2012.01) |
| G11B 5/012 | (2006.01) |
| G11B 5/00 | (2006.01) |
| G11B 5/31 | (2006.01) |
| G11B 5/48 | (2006.01) |

(52) U.S. Cl.
CPC ............ *G11B 5/6005* (2013.01); *G11B 5/012* (2013.01); *G11B 7/125* (2013.01); *G11B 5/314* (2013.01); *G11B 5/3106* (2013.01); *G11B 5/4853* (2013.01); *G11B 5/6064* (2013.01); *G11B 2005/0021* (2013.01)

(58) Field of Classification Search
None
See application file for complete search history.

(56) References Cited

U.S. PATENT DOCUMENTS

| 4,914,398 | A |  | 4/1990 | Jove et al. |
|---|---|---|---|---|
| 5,494,473 | A |  | 2/1996 | Dupuis et al. |
| 5,527,110 | A |  | 6/1996 | Abraham et al. |
| 5,712,747 | A |  | 1/1998 | Voldman et al. |
| 5,748,412 | A | * | 5/1998 | Murdock ............... G11B 5/11 360/323 |
| 5,768,068 | A |  | 6/1998 | Eckberg et al. |
| 5,850,374 | A |  | 12/1998 | Abraham et al. |
| 5,896,249 | A | * | 4/1999 | Fontana, Jr. ......... G11B 5/3103 360/234.5 |
| 6,034,849 | A |  | 3/2000 | Takizawa |
| 6,052,249 | A |  | 4/2000 | Abraham |

(Continued)

OTHER PUBLICATIONS

U.S. File History for U.S. Appl. No. 13/836,124.
U.S. File History for U.S. Appl. No. 14/050,725.

*Primary Examiner* — Tan X Dinh
(74) *Attorney, Agent, or Firm* — Hollingsworth Davis, LLC (57) ABSTRACT

An apparatus includes a slider of a recording head comprising a plurality of electrical bond pads coupled to bias sources and a ground pad. Each of a plurality of electrical components of the slider is coupled to at least one of the electrical bond pads. At least one of the electrical bond pads is a shared electrical bond pad coupled to at least two of the electrical components. At least one diode is coupled to at least one of the electrical bond pads and at least one of the electrical components.

18 Claims, 11 Drawing Sheets

(56) References Cited

U.S. PATENT DOCUMENTS

| | | |
|---|---|---|
| 6,347,983 B1 | 2/2002 | Hao et al. |
| 6,623,330 B2 | 9/2003 | Fukuroi |
| 6,813,118 B2 | 11/2004 | Pust et al. |
| 7,088,543 B2 | 8/2006 | Satoh et al. |
| 7,133,254 B2 | 11/2006 | Hamann et al. |
| 7,362,534 B1 | 4/2008 | Schreck et al. |
| 7,446,977 B2 | 11/2008 | Nikitin et al. |
| 7,466,516 B2 | 12/2008 | Lille |
| 7,551,406 B1 | 6/2009 | Thomas et al. |
| 7,643,250 B2 | 1/2010 | Araki et al. |
| 7,782,568 B2 | 8/2010 | Shiraki et al. |
| 7,936,538 B1 | 5/2011 | Zhang et al. |
| 7,969,687 B2 | 6/2011 | Lee et al. |
| 8,098,450 B2 | 1/2012 | Baumgart et al. |
| 8,159,780 B2 | 4/2012 | Brand |
| 8,169,751 B2 | 5/2012 | Albrecht et al. |
| 8,297,113 B2 | 10/2012 | Liners et al. |
| 8,310,779 B2 | 11/2012 | Hanchi |
| 8,400,736 B2 | 3/2013 | Greminger et al. |
| 8,432,636 B2 | 4/2013 | Brand |
| 8,804,272 B1 | 8/2014 | Johnson et al. |
| 8,879,189 B2 | 11/2014 | Miyamoto et al. |
| 8,937,791 B1 | 1/2015 | Olson et al. |
| 8,953,275 B2 | 2/2015 | Chou et al. |
| 2007/0035881 A1 | 2/2007 | Burbank et al. |
| 2007/0230056 A1 | 10/2007 | Beach et al. |
| 2009/0040645 A1* | 2/2009 | Shimazawa ............... G11B 5/02 360/59 |
| 2009/0052076 A1* | 2/2009 | Shimazawa ............ G11B 5/314 360/59 |
| 2009/0052077 A1* | 2/2009 | Tanaka ..................... G11B 5/02 360/59 |
| 2009/0195930 A1 | 8/2009 | Lille |
| 2010/0226044 A1 | 9/2010 | Iwase |
| 2011/0013316 A1* | 1/2011 | Brand .................. G11B 5/3133 360/110 |
| 2011/0248167 A1* | 10/2011 | Gurvitch .................. G01J 5/20 250/338.1 |
| 2012/0113207 A1 | 5/2012 | Zheng |
| 2012/0120519 A1 | 5/2012 | Kunkel et al. |
| 2012/0120522 A1 | 5/2012 | Johnson et al. |
| 2012/0120527 A1 | 5/2012 | Kunkel et al. |
| 2013/0188273 A1* | 7/2013 | Miyamoto ........... G11B 5/6076 360/59 |
| 2014/0269838 A1* | 9/2014 | Macken ................ G11B 5/607 374/183 |
| 2015/0103430 A1* | 4/2015 | Gadbois ............... G11B 5/4853 360/59 |

\* cited by examiner

Writing

*FIGURE 6D*

Reading

*FIGURE 7A*

Reading

*FIGURE 7B*

Writing

BOND PAD SHARING FOR POWERING A MULTIPLICITY OF ELECTRICAL COMPONENTS OF A RECORDING HEAD

SUMMARY

Various embodiments are directed to an apparatus which includes a slider of a recording head comprising a plurality of electrical bond pads coupled to bias sources and a ground pad. Each of a plurality of electrical components of the slider is coupled to at least one of the electrical bond pads. At least one of the electrical bond pads is a shared electrical bond pad coupled to at least two of the electrical components. At least one diode is coupled to at least one of the electrical bond pads and at least one of the electrical components.

Some embodiments are directed to an apparatus which includes a slider of a recording head comprising a plurality of electrical bond pads coupled to bias sources and a ground pad. Each of a plurality of electrical components of the slider is coupled to one of the electrical bond pads and to a ground pad of the slider. The apparatus also includes a plurality of diodes, wherein at least one diode is coupled to the one electrical bond pad and a respective one of the plurality of electrical components. At least some of the diodes are arranged to conduct alternately depending on the polarity of the one electrical bond pad relative to the ground pad.

Other embodiments are directed to an apparatus which includes a slider of a heat-assisted magnetic recording head comprising a near-field transducer proximate an optical waveguide, a reader, and a writer situated proximate the near-field transducer. The slider also comprises a plurality of electrical bond pads coupled to bias sources and a ground pad, and a plurality of electrical components each coupled to at least one of the electrical bond pads. At least one of the electrical bond pads is a shared electrical bond pad coupled to at least two of the electrical components. At least one diode is coupled to at least one of the electrical bond pads and at least one of the electrical components.

The above summary is not intended to describe each disclosed embodiment or every implementation of the present disclosure. The figures and the detailed description below more particularly exemplify illustrative embodiments.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Data storage systems commonly include one or more transducers that write and read information to and from a magnetic storage medium. A recording transducer, for example, incorporates several distinct electrical and, in some implementations, optical components that require specified voltages/currents to operate properly. Representative examples of such electrical transducer components include a reader, a reader heater, a writer, and a writer heater, among other possible components. Some recording transducers incorporate one or more sensors, such as contact sensors, each requiring specified operating voltages/currents. Each of the electrically activated components of a transducer is electrically coupled to corresponding electrical contacts or bond pads of the transducer. Depending on the particular design of a given transducer, various bond pads can be configured as voltage sources, current sources, and ground contacts, and can also send and receive signals (e.g., write signals, readback signals, sensor signals, control signals). Because bond pads take up appreciable space on a transducer and adding bond pads can be very expensive due to changes in design and fabrication processes needed to accommodate such additional bond pads, it is desirable to minimize both the number of bond pads and changes to the bond pad configuration of a transducer.

Various embodiments of the disclosure are directed to a transducer that incorporates a set of bond pads coupled to bias sources and a multiplicity of electrical components coupled to the bond pad set, wherein at least one of the bond pads is shared between at least two of the electrical components. The transducer can include two or more electrically activated components, such as a writer, one or more readers, one or more heaters, and one or more sensors, for example. Some embodiments are directed to a transducer that incorporates a set of bond pads, wherein a single bond pad (coupled to a bias source) is shared by at least two electrical components that are also coupled to a ground pad. It is to be understood that a ground pad is not considered an electrically energized bond pad that is coupled to a bias source. Rather, a ground pad is a pad coupled to an electrical ground of the transducer circuitry.

An issue with adding additional components or any electrical feature in general to an existing slider or HGA is the real estate required to place bond pads which allow access to these new features. Some slider form factors, for example, can accommodate nine bond pads. In other sliders, a total of ten bond pads is likely feasible. Any increase in bond pad count above nine or ten (depending on the slider/ HGA design) likely requires migration to a top bond pad configuration, which is both more technically challenging and expensive. An alternative to adding an additional bond pad above the designed-in pad count is to share an existing bond pad between two or more electrical devices on the slider.

Sharing a common bond pad between two or more electrical components (e.g., readers) can raises the issue of bias contention as well as degraded performance (e.g., degraded common mode rejection). Such issues can be addressed by addition or modification of biasing and filtering circuitry, although this approach adds some degree of complexity to the design. An alternative and simpler approach involves pad sharing between electrical components having the same or similar biasing and/or filtering requirements. Another example of this approach involves a bond pad shared between electrical components that operate at different times or can be operated alternately.

One example of this approach involves a bond pad shared between a contact sensor (e.g., a thermal coefficient of resistance (TCR) contact sensor) and a reader or a heater. In some embodiments, for example, a contact sensor may not be required to be active at the same time as a reader, so there is little risk of contention on the shared bond pad. A TCR contact sensor and a typical reader, for example, are primarily resistive loads and so the addition of an extra termination load on the other non-shared reader pad will mostly mitigate any impedance mismatch on the two reader traces back to the pre-amplifier, thus minimizing the impact of common mode noise. Other examples of bond pad sharing between electrical components that operate at different times or can be operated alternately include circuitry comprising a TCR contact sensor and a reader heater, circuitry comprising a TCR contact sensor and a writer heater, circuitry comprising a reader and a writer heater, and combinations of these circuits.

Figures 1, 2:
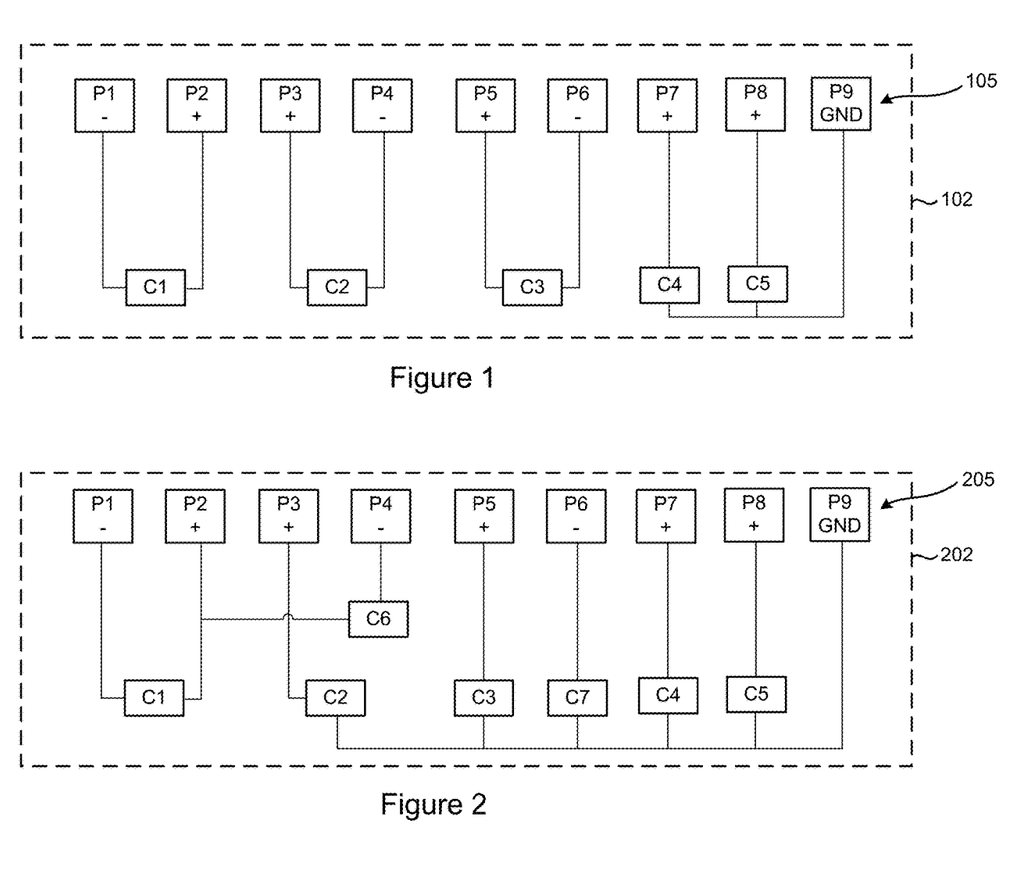
FIG. 1 illustrates an embodiment of a recording transducer that does not utilize pad sharing.
FIG. 2 illustrates a recording transducer that utilizes pad sharing according to embodiments of the present disclosure.

FIG. 1 illustrates an embodiment of a recording transducer that does not utilize pad sharing according to the present disclosure. FIG. 2 illustrates a recording transducer that utilizes pad sharing according to embodiments of the present disclosure. The bond pad layout shown in FIG. 1 is the same as that shown in FIG. 2, and the electrical components identified as C1-C5 in FIG. 1 are the same as those shown as components C1-C5 in FIG. 2 for purposes of illustration. It is understood that the bond pad layout, components, and wiring configuration shown in FIGS. 1 and 2 are provided for non-limiting illustrative purposes.

FIG. 1 illustrates a slider 102 that supports a recording transducer comprising a multiplicity of electrical components (C1-C5) coupled to a set 105 of bond pads (P1-P9). The set 105 of bond pads includes eight electrical bond pads (P1-P8) and one ground pad (P9), also referred to herein simply as ground). The term "electrical bond pad" refers to a bond pad that is coupled to a bias source, such as a voltage or current source (AC or DC), that provides power for an electrical component. The slider 102 shown in FIG. 1 utilizes eight electrical bond pads (P1-P8) to power five electrical components (C1-C5).

Electrical components C1-C3 can be referred to as dual-ended components, since each is coupled between a pair of electrical bond pads (e.g., one end of C1 is connected to negative pad P1 and the other end of C1 is connected to positive pad P2). Each dual-ended component requires two electrical bond pads for proper operation. Electrical components C4 and C5 can be referred to as single-ended components, since each is coupled between a single electrical bond pad and ground (e.g., one end of C5 is connected to positive pad P8 and the other end of C5 is connected to ground pad P9). Each single-ended component requires one electrical bond pad for proper operation. It is noted that the polarity of the electrical bond pads can change during operation, such that a given pad can be at a positive potential during one operating state and at a negative potential during another operating state.

FIG. 2 shows an apparatus according to various embodiments that includes a slider 202 comprising a plurality of electrical bond pads coupled to bias sources 205. The slider 202 further comprises a plurality of electrical components each coupled to at least one of the electrical bond pads. At least one of the electrical bond pads is shared between a plurality of the electrical components. According to some embodiments, the slider 202 supports a recording transducer comprising a multiplicity of electrical components (C1-C7) coupled to a set 205 of bond pads (P1-P9). As previously discussed, the set 205 of bond pads is the same as the bond pad set 205 shown in FIG. 1 (i.e., 8 electrical bond pads and 1 ground pad). In contrast to the slider 205 illustrated in FIG. 1 which supports five electrical components using eight electrical bond pads, the slider 205 shown in FIG. 2 supports seven electrical components while using the same number (i.e., 8) of electrical bond pads.

In FIG. 2, electrical bond pad P2 is shared between electrical components C1 and C6, thereby freeing up one electrical bond pad for other use or elimination. The electrical component C2 in FIG. 2, which performs the same function as C2 in FIG. 1, is implemented as a single-ended component, thereby freeing up one electrical bond pad for other use or elimination. By freeing up two electrical bond pads in the illustrative slider 202 shown in FIG. 2, two additional components (C6 and C7) have been added to the slider 202 as compared to the implementation illustrated in FIG. 1.

The need for sharing of electrical bond pads has intensified in the advent of recording heads configured for heat-assisted magnetic recording (HAMR), also referred to as energy-assisted magnetic recording (EAMR), thermally-assisted magnetic recording (TAMR), and thermally-assisted recording (TAR). In addition to convention components, A HAMR head incorporates various optical components and sensors that require power supplied by the set of bond pads made available at the transducer. The increase in the number and type of components and sensors of a HAMR head significantly complicates the electrical bond pad connection and powering strategy for a particular HAMR head design.

Figure 3:
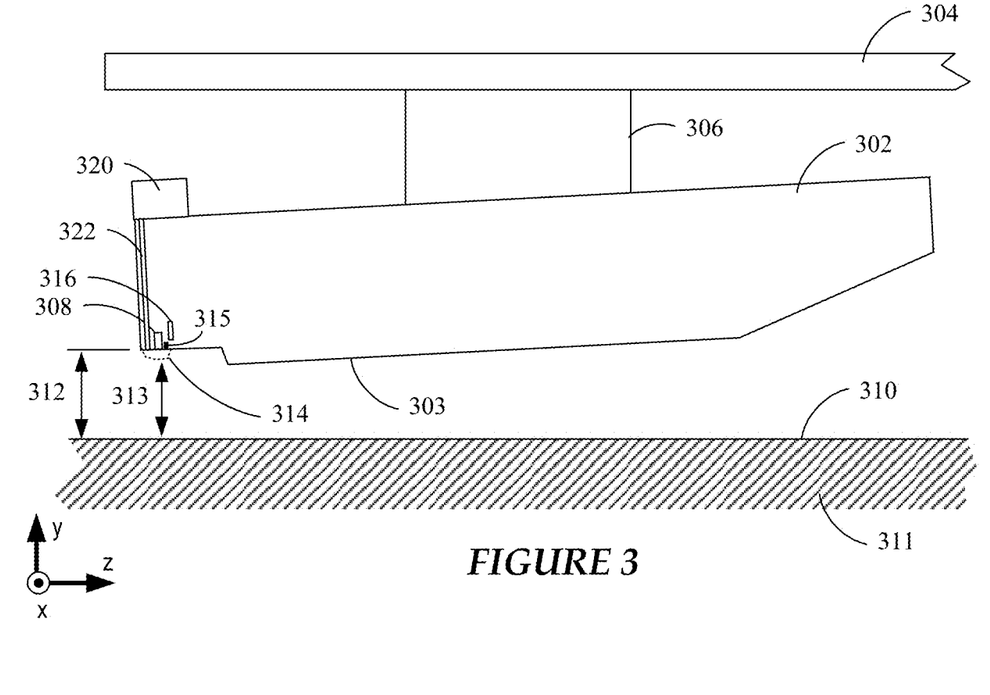
FIG. 3 shows a side view of a read/write transducer configured for heat-assisted magnetic recording according to a representative embodiment.

FIG. 3 shows a side view of a read/write transducer 302 configured for heat-assisted magnetic recording according to a representative embodiment. The read/write transducer 302 may be used in a magnetic data storage device, e.g., a hard disk drive. The read/write transducer 302 may also be referred to herein as a slider, read head, recording head, etc. The read/write transducer 302 is coupled to an arm 304 by way of a suspension 306 that allows some relative motion between the read/write transducer 302 and arm 304. The read/write transducer 302 includes read/write transducers 308 at a trailing edge that are held proximate to a surface 310 of a magnetic recording medium 311, e.g., magnetic disk. The read/write transducer 302 further includes a laser 320 and a waveguide 322. The waveguide 322 delivers light from the laser 320 to components (e.g., a near-field transducer) near the read/write transducers 308.

When the read/write transducer 302 is located over surface 310 of recording medium 311, a flying height 312 is maintained between the read/write transducer 302 and the surface 310 by a downward force of arm 304. This downward force is counterbalanced by an air cushion that exists between the surface 310 and an air bearing surface 303 (also referred to herein as a "media-facing surface") of the read/write transducer 302 when the recording medium 311 is rotating. It is desirable to maintain a predetermined slider flying height 312 over a range of disk rotational speeds during both reading and writing operations to ensure consistent performance. Region 314 is a "close point" of the read/write transducer 302, which is generally understood to be the closest spacing between the read/write transducers 308 and the magnetic recording medium 311, and generally defines the head-to-medium spacing 313.

To account for both static and dynamic variations that may affect slider flying height 312, the read/write transducer 302 may be configured such that a region 314 of the read/write transducer 302 can be configurably adjusted during operation in order to finely adjust the head-to-medium spacing 313. This is shown in FIG. 3 by a dotted line that represents a change in geometry of the region 314. In this example, the geometry change may be induced, in whole or in part, by an increase or decrease in temperature of the region 314 via a heater 316. A thermal sensor 315 is shown situated at or near the close point 314 (e.g., adjacent the read/write transducers 308, such as near the near-field transducer) or can be positioned at other location of the ABS 303.

Figure 4:
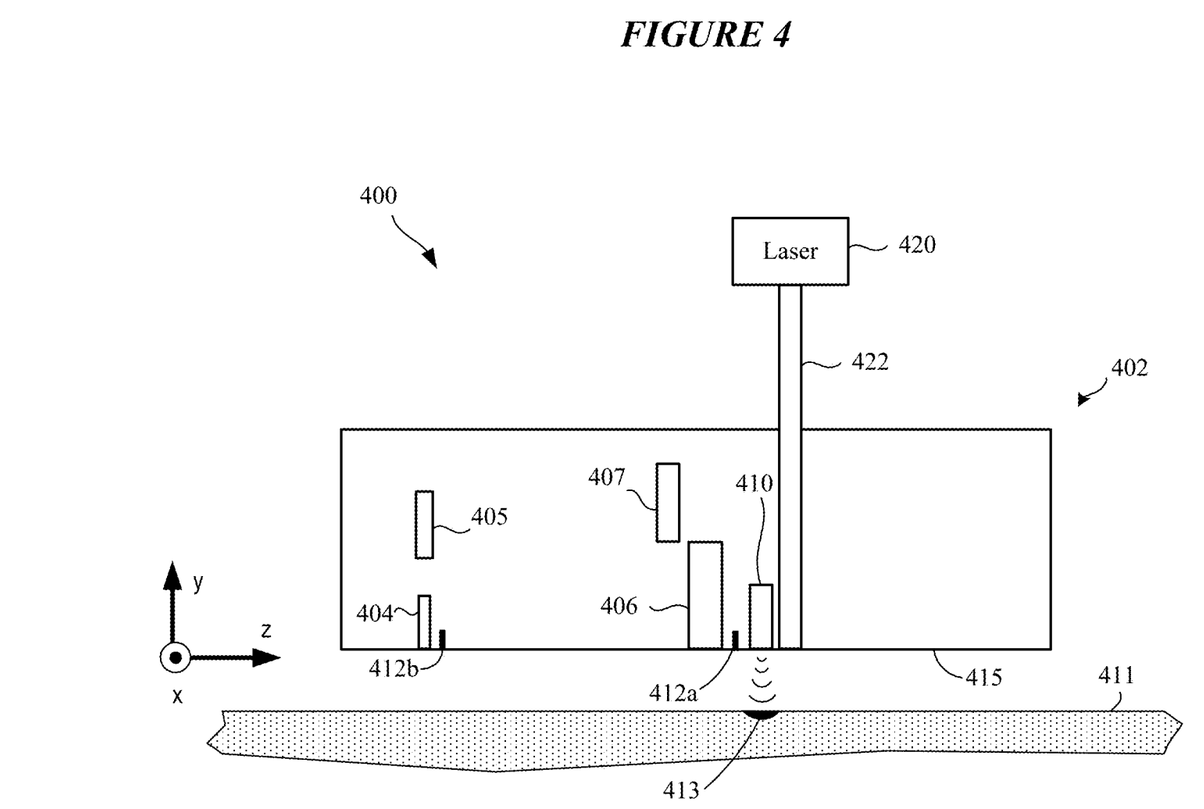
FIG. 4 shows a HAMR head arrangement in accordance with various embodiments.

FIG. 4 shows a HAMR head arrangement 400 in accordance with various embodiments. The recording head arrangement 400 includes a slider 402 positioned proximate a rotating magnetic medium 411. The slider 402 includes a reader 404 and a writer 406 proximate the ABS 415 for respectively reading and writing data from/to the magnetic medium 411. The writer 406 is located adjacent a near-field transducer (NFT) 410 which is optically coupled to a light source 420 (e.g., laser diode) via a waveguide 422. The light source 420 can be mounted external, or integral, to the slider 402. The light source 420 energizes the NFT 410 via the waveguide 422. The writer 406 includes a corresponding heater 407, and the reader 404 includes a corresponding heater 405 according to various embodiments. The writer heater 407 can be powered to cause protrusion of the ABS 415 predominately in the ABS region at or proximate the writer 406, and the reader heater 405 can be powered to cause protrusion of the ABS 415 predominately in the ABS region at or proximate the reader 404. Power can be controllably delivered independently to the heaters 407 and 405 to adjust the fly height (e.g., clearance) of the slider 402 relative to the surface of the recording medium 411. One or more thermal sensors 412a, 412b can be situated at various locations on the slider 402 at or near the ABS 415 for purposes of monitoring temperature, head-medium spacing changes, and head-medium contact.

A HAMR device utilizes the types of optical devices described above to heat a magnetic recording media (e.g., hard disk) in order to overcome superparamagnetic effects that limit the areal data density of typical magnetic media. When writing with a HAMR device, the electromagnetic energy (e.g., laser or light) is concentrated onto a small hot spot 413 over the track of the magnetic medium 411 where writing takes place, as shown in FIG. 4. The light from the source 420 propagates to the NFT 410, e.g., either directly from the source 420 or through the mode converter or by way of a focusing element. Other optical elements, such as couplers, mirrors, prisms, etc., may also be formed integral to the slider.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot 413 is on the order of 50 nm or less. Thus, the desired hot spot size is well below half the wavelength of the light. Optical focusers cannot be used to obtain the desired hot spot size, being diffraction limited at this scale. As a result, the NFT 410 is employed to create a hot spot on the media.

The NFT 410 is a near-field optics device configured to generate local surface plasmon resonance at a designated (e.g., design) wavelength. The NFT 410 is generally formed from a thin film of plasmonic material (e.g., gold, silver, copper) on a substrate. In a HAMR slider 402, the NFT 410 is positioned proximate the write pole of the writer 406. The NFT 410 is aligned with the plane of the ABS 415 parallel to the read/write surface of the magnetic medium 411. The NFT 410 achieves surface plasmon resonance in response to the incident electromagnetic energy. The plasmons generated by this resonance are emitted from the NFT 410 towards the magnetic medium 411 where they are absorbed to create the hot spot 413. At resonance, a high electric field surrounds the NFT 410 due to the collective oscillations of electrons at the metal surface (e.g., substrate) of the magnetic medium 411. At least a portion of the electric field surrounding the NFT 410 tunnels into, and gets absorbed by, the magnetic medium 411, thereby raising the temperature of the spot 413 on the medium 411 as data is being recorded.

Various embodiments of bond pad sharing by a multiplicity of transducer components will now be described in greater detail. In general, embodiments of the disclosure incorporate one or more diodes into bond pad sharing circuitry to control which and when a particular component is energized, thereby allowing multiple components sharing a bond pad to operate independently. Some of the embodiments described below are directed to an apparatus comprising a slider of a recording head which includes a plurality of electrical bond pads coupled to bias sources and a ground pad. Each of a plurality of electrical components of the slider is coupled to at least one of the electrical bond pads. At least one of the electrical bond pads is a shared electrical bond pad coupled to at least two of the electrical components. At least one diode is coupled to at least one of the electrical bond pads and at least one of the electrical components.

In some embodiments, a first electrical component is coupled between first and second electrical bond pads, and a second electrical component is coupled between the second electrical bond pad and a ground pad of the slider. The at least one diode is coupled to the second electrical bond pad and the second electrical component, and the first and second components are energized alternately depending on the polarity of the first and second electrical bond pads.

According to further embodiments, at least two of the electrical components are coupled in parallel between a pair of the electrical bond pads. In some embodiments, for example, a first electrical component and a second electrical component are coupled in parallel between a first electrical bond pad and a second electrical bond pad. A first diode is coupled to the first electrical component, and a second diode is coupled to the second electrical component. The first and second diodes are arranged to conduct alternately depending on the polarity of the first and second electrical bond pads.

Figure 5A:
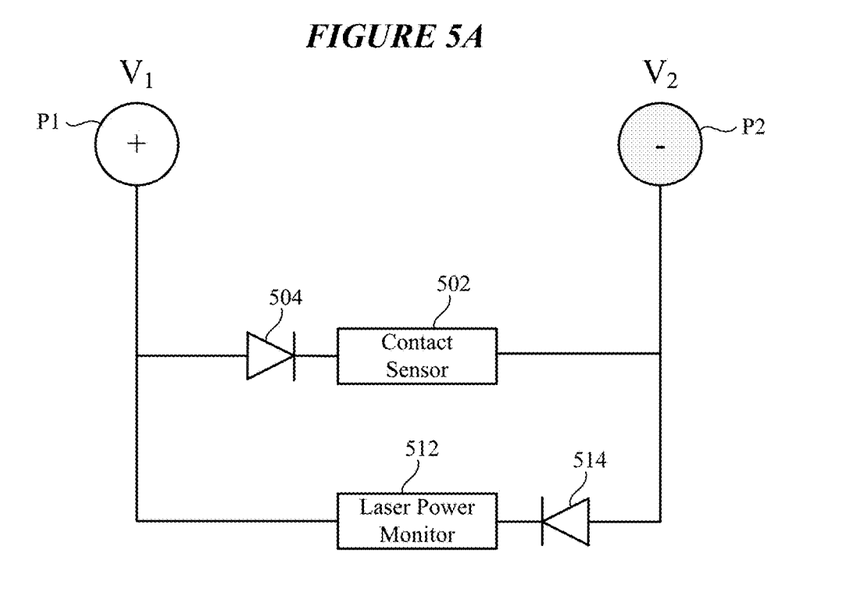
FIGS. 5A and 5B illustrate circuits that support bond pad sharing between a multiplicity of components in accordance with various embodiments.
Figure 5B:
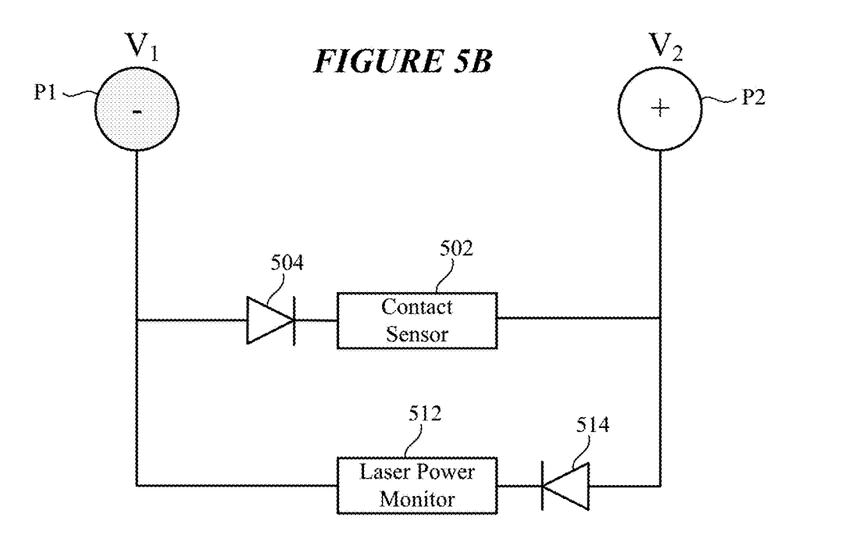

FIGS. 5A and 5B illustrate circuits that support bond pad sharing between a multiplicity of components in accordance with various embodiments. In FIGS. 5A and 5B, two bond pads, P1 and P2, are shown for illustrative purposes. Bond pads P1 and P2 can be biased in a number of ways, such as by alternating the polarity of the voltages supplied to bond pads P1 and P2. In the embodiment shown in FIG. 5A, the contact sensor 502 is coupled in series to a diode 504, and the two components 502, 504 are coupled to bond pad P1 and bond pad P2. More particularly, the anode of the diode 504 is coupled to bond pad P1, and the cathode of the diode 504 is coupled to the contact sensor 502. The contact sensor 502 can be implemented as a thermal sensor, such as a resistive temperature sensor (e.g., TCR sensor), for example. The contact sensor 502 can be implemented using other technologies, such as a thermocouple or a thermistor. The contact sensor 502 is typically situated at the air bearing surface of the slider.

The circuitry shown in FIG. 5A further includes a laser power monitor 512, which is also situated at the air bearing surface of the slider. The laser power monitor 512 is a sensor configured to generate a signal in response to optical energy impinging on the sensor. The laser power monitor 512, for example, can be implemented as a bolometer. A bolometer, for example, can be implemented as a small wire having a temperature coefficient of resistance and positioned proximate or in the vicinity of an optical component (e.g., NFT, waveguide) of a HAMR slider. The laser power monitor 512 is configured to sense and monitor the output optical power of the laser source used to energize the NFT via the waveguide of the slider. The laser power monitor 512 is shown coupled in series to a diode 514, and the two components 512, 514 are coupled to bond pads P1 and P2. More particularly, the anode of the diode 514 is coupled to bond pad P2, and the cathode of diode 514 is coupled to the laser power monitor 512. In the embodiment shown in FIGS. 5A and 5B, the contact sensor 502 and laser power monitor 512 are coupled in parallel to bond pads P1 and P2.

In FIG. 5A, the voltage $V_1$ of bond pad P1 is greater than the voltage $V_2$ of bond pad P2. As illustrated, the voltage $V_1$ is a positive voltage, and the voltage $V_2$ is a negative voltage. Given the polarities of the voltages $V_1$ (+) and $V_2$ (−) shown in FIG. 5A, and assuming the potential difference across diode 504 is sufficient to forward bias the diode, diode 504 conducts current thereby energizing the contact sensor 502. While diode 504 is forward biased, diode 514 is reversed biased, such that no current flows through the laser power monitor 512. As such, the contact sensor 502 is active while the laser power monitor 512 is inactive in FIG. 5A. The operating scenario depicted in FIG. 5A is applicable for operations in which the optical components of a HAMR slider are generally inactive. During read operations or contact detection, for example, the laser power monitor 512 is generally not needed.

In FIG. 5B, the voltage $V_1$ of bond pad P1 is less than voltage $V_2$ of bond pad P2. As illustrated in FIG. 5B, the voltage $V_1$ is a negative voltage, and the voltage $V_2$ is a positive voltage. Given the polarities of the voltages $V_1$ (−) and $V_2$ (+) shown in FIG. 5B, and assuming the potential difference across diode 514 is sufficient to forward bias the diode, diode 514 conducts current thereby energizing the laser power monitor 512. While the diode 514 is forward biased, diode 504 is reversed biased, such that no current flows through the contact sensor 502. As such, the laser power monitor 512 is active while the contact sensor 502 is inactive in FIG. 5B. The operating scenario depicted in FIG. 5B is applicable for operations in which the contact sensor 502 is not needed, such as during reading or writing operations.

Figure 6A:
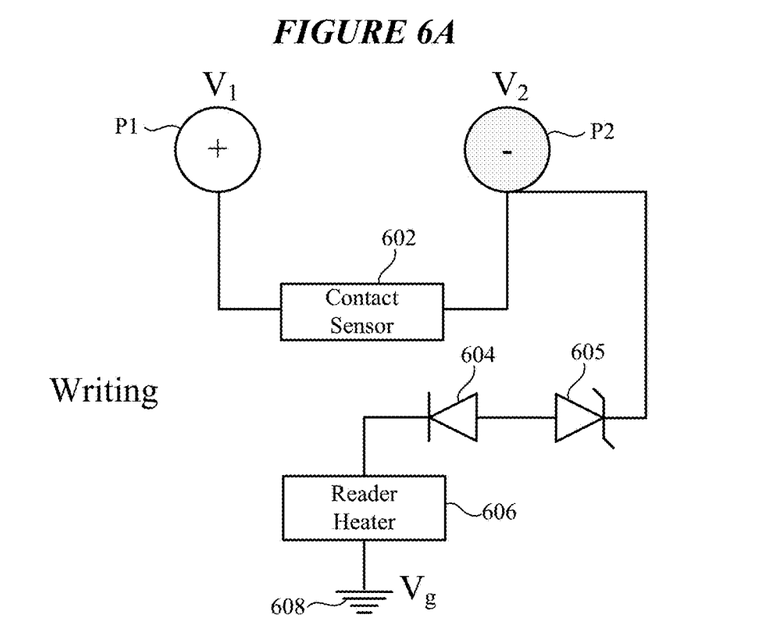
FIGS. 6A and 6B illustrate circuitry configured to facilitate bond pad sharing between a contact sensor and a reader heater in accordance with various embodiments.
Figure 6B:
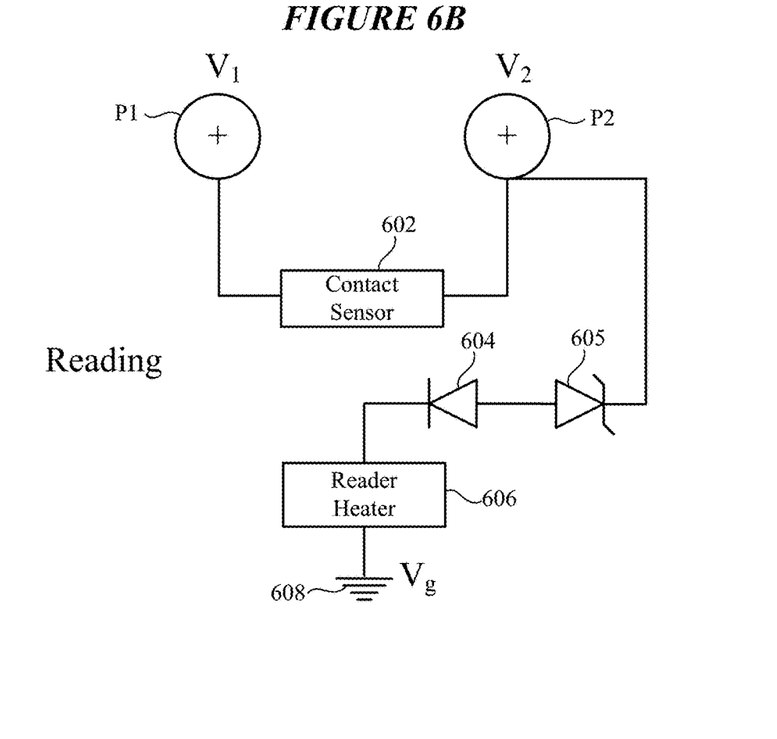

FIGS. 6A and 6B illustrate circuitry configured to facilitate bond pad sharing between a contact sensor 602 and the reader heater 606 in accordance with various embodiments. In the embodiment shown in FIG. 6A, the contact sensor 602 is coupled between bond pad P1 and bond pad P2. The reader heater 606 is coupled between bond pad P2 and a ground pad 608. A diode 604 is coupled between the reader heater 606 and the bond pad P2. As illustrated, the anode of diode 604 is coupled to bond pad P2, and the cathode of the diode 604 is coupled to the reader heater 606. Given the polarities of the voltages $V_1$ (+) and $V_2$ (−) shown in FIG. 6A, the contact sensor 602 is energized while the reader heater 606 is inactive due to reverse biasing of the diode 604. The operating scenario depicted in FIG. 6A is applicable for write operations in which the contact sensor 602 is active and the reader heater 606 is not needed.

In FIG. 6B, the voltages $V_1$ and $V_2$ supplied to bond pads P1 and P2 differ from that shown for FIG. 6A, and are selected to facilitate reading operations. In a first operating mode, the reader heater 606 is energized by the voltage $V_2$ at bond pad P2 exceeding that of the ground pad potential, $V_g$. This assumes that the potential drop across the diode 604 is sufficient to forward bias the diode. In this first illustrative operating mode, the magnitude of the voltage $V_1$ at bond pad P1 is equivalent to the voltage $V_2$ at bond pad P2. In this operating scenario, no current flows through the contact sensor 602 which is thereby rendered inactive.

In a second operating mode, the voltages $V_1$ and $V_2$ on bond pads P1 and P2 differ, such that a potential difference is developed across the contact sensor 602. In this operating mode, the contact sensor 602 is active at the same time the reader heater 606 is active. This can be accomplished by providing a positive voltage $V_1$ at bond pad P1 that exceeds a positive voltage $V_2$ at bond pad P2. This can also be accomplished by providing a negative voltage $V_1$ at bond pad P1, while the voltage $V_2$ at bond pad P2 remains positive. The operating scenario depicted in FIG. 6B is applicable for reading operations in which the contact sensor 602 is active at the same time as the reader heater 606.

In some embodiments, a Zener diode 605 can be incorporated into the circuitry of FIGS. 6A and 6B to enhance immunity to ground noise. As shown in FIGS. 6A and 6B, the anode of Zener diode 605 is coupled to the anode of diode 604, and the cathode of Zener diode 605 is coupled to bond pad P2. With the Zener diode 605 incorporated into the circuitry as shown, proper operation can be achieved when the voltage across the Zener diode 605>the Zener reverse breakdown voltage and the Zener reverse breakdown voltage>>maximum amplitude of ground noise.

Figure 6C:
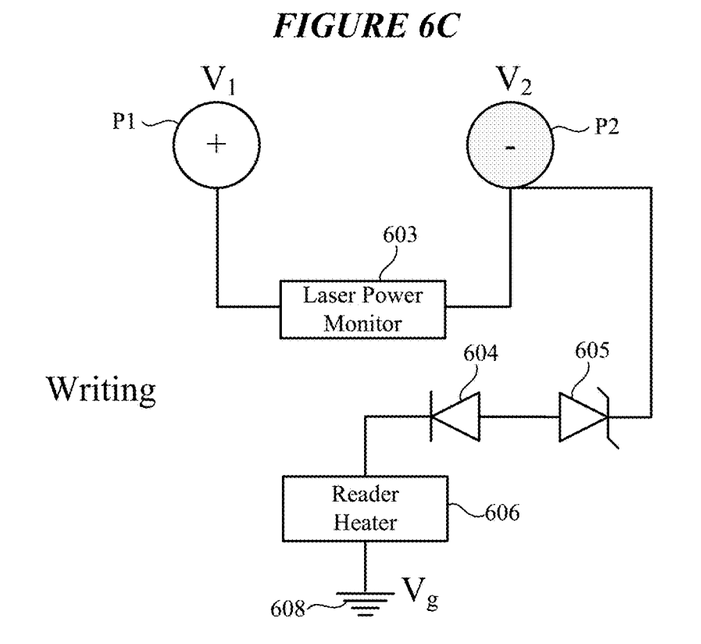
FIGS. 6C and 6D illustrate circuitry configured to facilitate bond pad sharing between a laser power monitor and a reader heater in accordance with various embodiments.
Figure 6D:
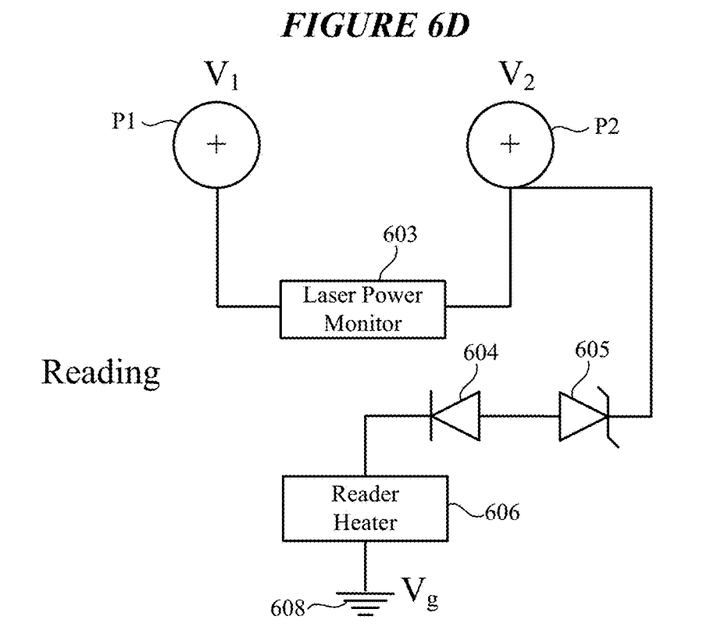

FIGS. 6C and 6D illustrate circuitry configured to facilitate bond pad sharing between a laser power monitor 603 and the reader heater 606 in accordance with various embodiments. In the embodiment shown in FIG. 6C, the laser power monitor 603 is coupled between bond pad P1 and bond pad P2. The reader heater 606 is coupled between bond pad P2 and a ground pad 608. A diode 604 is coupled between the reader heater 606 and the bond pad P2. As shown, the anode of diode 604 is coupled to bond pad P2, and the cathode of the diode 604 is coupled to the reader heater 606. Given the polarities of the voltages $V_1$ (+) and $V_2$ (−) shown in FIG. 6C, the laser power monitor 603 is energized while the reader heater 606 is inactive due to reverse biasing of the diode 604. The operating scenario depicted in FIG. 6C is applicable for write operations in which the laser power monitor 603 is active (along with the writer) and the reader heater 606 is not needed.

In FIG. 6D, the voltages $V_1$ and $V_2$ supplied to bond pads P1 and P2 differ from that shown for FIG. 6C, and are selected to facilitate reading operations. During reading operations, the reader heater 606 is energized by the voltage $V_2$ at bond pad P2 exceeding that of the ground pad potential, $V_g$. This assumes that the potential drop across the diode 604 is sufficient to forward bias the diode. In this illustrative operating mode, the magnitude of the voltage $V_1$ at bond pad P1 is equivalent to the voltage $V_2$ at bond pad P2. In this operating scenario, no current flows through the laser power monitor 603 which is thereby rendered inactive.

In some embodiments, a Zener diode 605 can be incorporated into the circuitry of FIGS. 6C and 6D to enhance immunity to ground noise. As shown in FIGS. 6C and 6D, the anode of Zener diode 605 is coupled to the anode of diode 604, and the cathode of Zener diode 605 is coupled to bond pad P2. With the Zener diode 605 incorporated into the circuitry as shown, proper operation can be achieved when the voltage across the Zener diode 605>the Zener reverse breakdown voltage and the Zener reverse breakdown voltage>>maximum amplitude of ground noise.

Figure 7A:
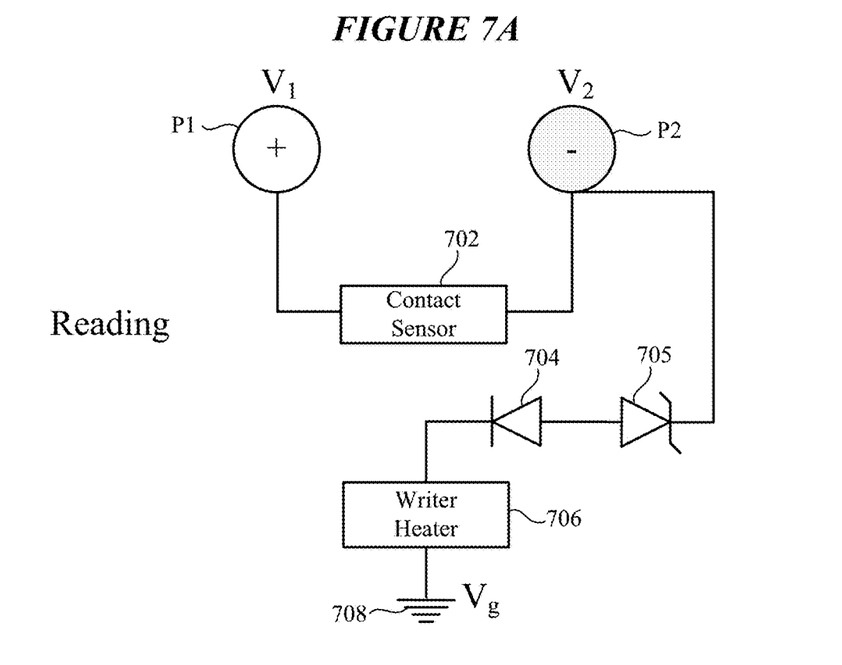
FIGS. 7A and 7B illustrate circuitry configured to facilitate bond pad sharing between a contact sensor and a writer heater in accordance with various embodiments.
Figure 7B:
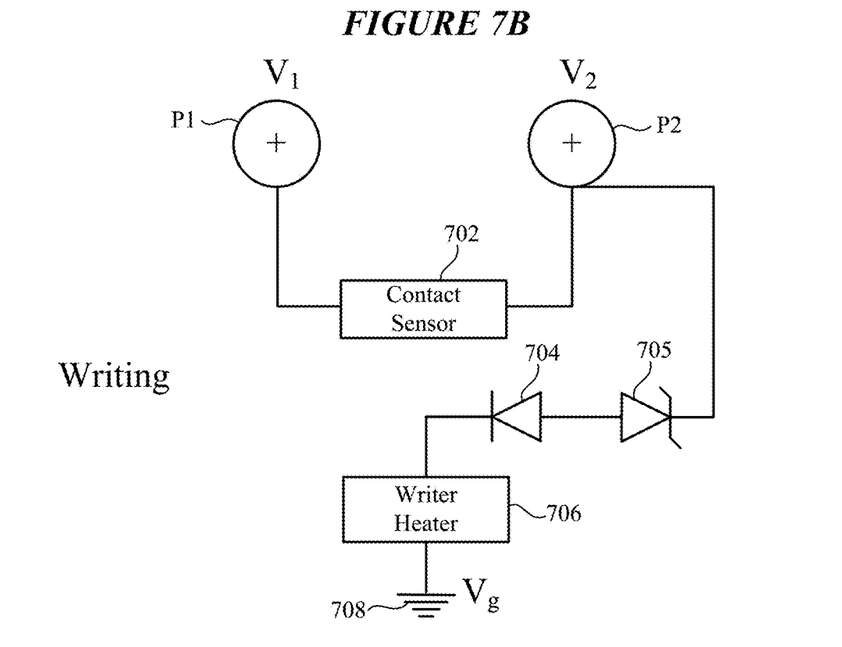

FIGS. 7A and 7B illustrate circuitry configured to facilitate bond pad sharing between a contact sensor 702 and the writer heater 706 in accordance with various embodiments. In the embodiment shown in FIG. 7A, the contact sensor 702 is coupled between bond pad P1 and bond pad P2. The writer heater 706 is coupled between bond pad P2 and a ground pad 708. A diode 704 is coupled between the writer heater 706 and the bond pad P2, with the anode of diode 704 coupled to bond pad P2 and the cathode of the diode 604 coupled to the writer heater 706. Given the polarities of the voltages $V_1$ (+) and $V_2$ (−) shown in FIG. 7A, the contact sensor 702 is energized while the writer heater 706 is inactive due to reverse biasing of the diode 704. The operating scenario depicted in FIG. 7A is applicable for reading operations in which the contact sensor 702 is active and the writer heater 706 is not needed.

In FIG. 7B, the voltages $V_1$ and $V_2$ supplied to bond pads P1 and P2 differ from that shown for FIG. 7A, and are selected to facilitate writing operations. In a first operating mode, the writer heater 706 is energized by the voltage $V_2$ at bond pad P2 exceeding that of the ground pad potential, $V_g$, assuming the potential drop across the diode 704 is sufficient to forward bias the diode. In this first illustrative operating mode, the magnitude of the voltage $V_1$ at bond pad P1 is equivalent to the voltage $V_2$ at bond pad P2, such that no current flows through the contact sensor 702 which is thereby rendered inactive.

In a second operating mode, the voltages $V_1$ and $V_2$ on bond pads P1 and P2 differ, such that a potential difference is developed across the contact sensor 702. In this operating mode, the contact sensor 702 is active at the same time the writer heater 706 is active. This can be accomplished by providing a positive voltage $V_1$ at bond pad P1 that exceeds a positive voltage $V_2$ at bond pad P2. This can also be accomplished by providing a negative voltage $V_1$ at bond pad P1, while the voltage $V_2$ at bond pad P2 remains positive. The operating scenario depicted in FIG. 7B is applicable for writing operations in which the contact sensor 702 is active at the same time as the writer heater 706.

According to some embodiments, a Zener diode 705 can be incorporated into the circuitry of FIGS. 7A and 7B to enhance immunity to ground noise. As was previously described, proper operation can be achieved when the voltage across the Zener diode 705>the Zener reverse breakdown voltage and the Zener reverse breakdown voltage>>maximum amplitude of ground noise.

Figure 8A:
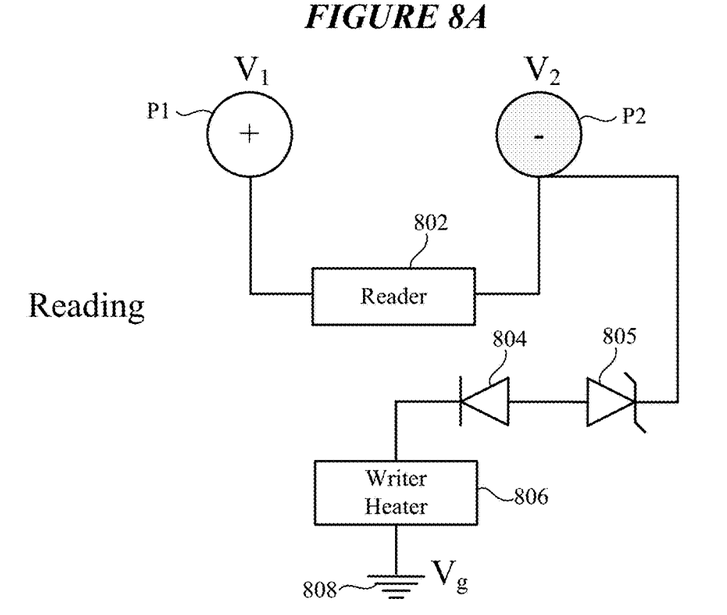
FIGS. 8A and 8B illustrate circuitry configured to facilitate bond pad sharing between a reader and a writer heater in accordance with various embodiments.
Figure 8B:
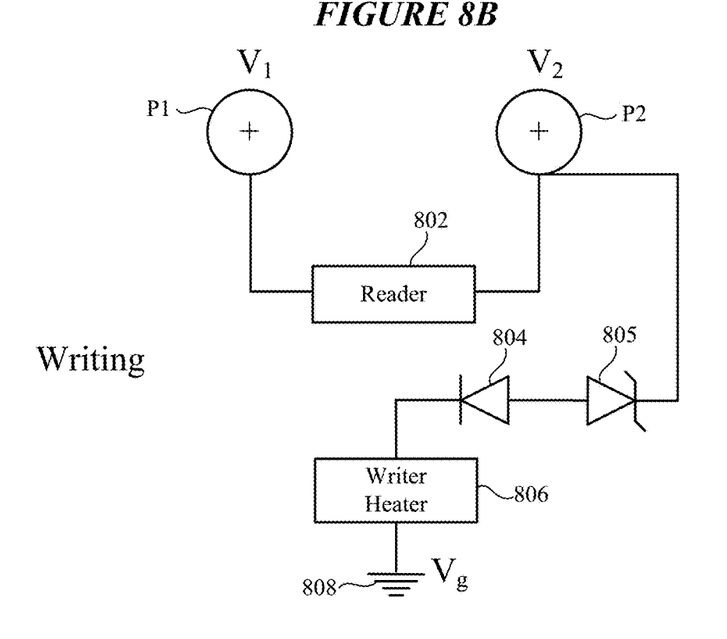

FIGS. 8A and 8B illustrate circuitry configured to facilitate bond pad sharing between a reader 802 and a writer heater 806 in accordance with various embodiments. In the embodiment shown in FIG. 8A, the reader 802 is coupled between bond pad P1 and bond pad P2. The writer heater 806 is coupled between bond pad P2 and a ground pad 808. A diode 804 is coupled between the writer heater 806 and the bond pad P2, with the anode of diode 804 coupled to bond pad P2 and the cathode of the diode 804 coupled to the writer heater 806. Given the polarities of the voltages $V_1$ (+) and $V_2$ (−) shown in FIG. 8A, the reader 802 is energized while the writer heater 806 is inactive due to reverse biasing of the diode 804. The operating scenario depicted in FIG. 8A is applicable for reading operations in which the reader 802 is active and the writer heater 806 is not needed.

In FIG. 8B, the voltages $V_1$ and $V_2$ supplied to bond pads P1 and P2 differ from that shown for FIG. 8A, and are selected to facilitate writing operations. The writer heater 806 is energized by the voltage $V_2$ at bond pad P2 exceeding that of the ground pad potential, $V_g$, assuming the potential drop across the diode 804 is sufficient to forward bias the diode. The magnitude of the voltage $V_1$ at bond pad P1 is equivalent to the voltage $V_2$ at bond pad P2 such that no current flows through the reader 802, thereby rendered the reader 802 inactive during writing operations.

In some embodiments, a Zener diode 805 can be incorporated into the circuitry of FIGS. 8A and 8B to enhance immunity to ground noise. As was previously described, proper operation can be achieved when the voltage across the Zener diode 805>the Zener reverse breakdown voltage and the Zener reverse breakdown voltage>>maximum amplitude of ground noise.

Figure 9A:
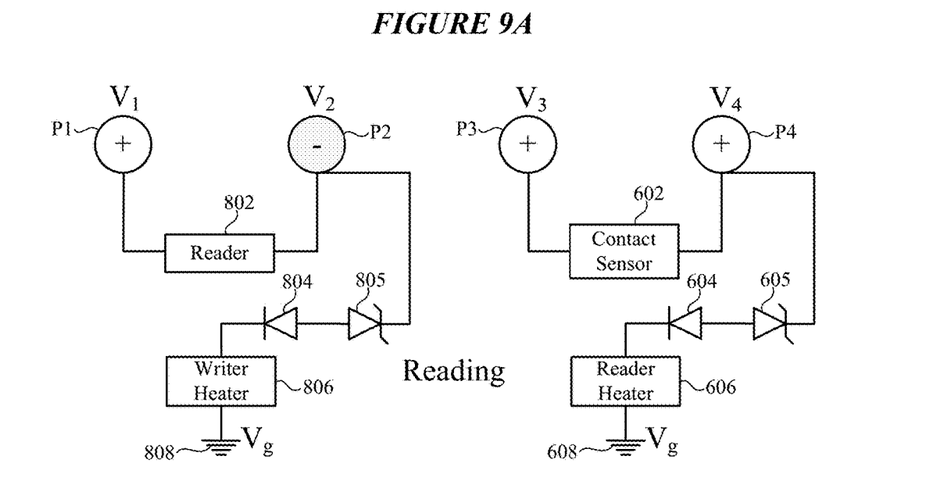
FIGS. 9A and 9B illustrate circuitry configured to facilitate bond pad sharing between a multiplicity of components in accordance with various embodiments.
Figure 9B:
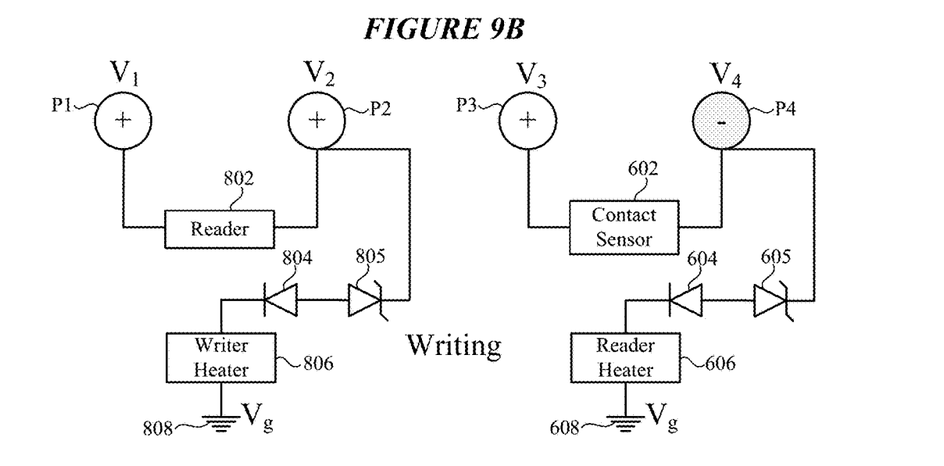

FIGS. 9A and 9B illustrate circuitry configured to facilitate bond pad sharing between a multiplicity of components in accordance with various embodiments. In the embodiment shown in FIG. 9A, the circuits of FIG. 8A and FIG. 6B (or 6D) are configured for concurrent operation during a reading mode. In the embodiment shown in FIG. 9B, the circuits of FIG. 8B and FIG. 6A (or 6D) are configured for concurrent operation during a writing mode.

During the reading mode (FIG. 9A), the reader 802 is active, the writer heater 806 is inactive, the reader heater 606 is active, and the contact sensor 602 can either be active or inactive, as previously discussed. In the case of FIG. 6D, the laser power monitor 603 is inactive during the reading mode. During the writing mode (FIG. 9B), the reader 802 is inactive, the writer heater 806 is active, the reader heater 606 is inactive, and the contact sensor 602 can either be active or inactive, as previously discussed. In the case of FIG. 6C, the laser power monitor 603 is active during the writing mode. It will be appreciated that other combinations of bond pad sharing circuits comprising different components are contemplated, and that those shown in FIGS. 9A and 9B are for non-limiting illustrative purposes.

Figure 10:
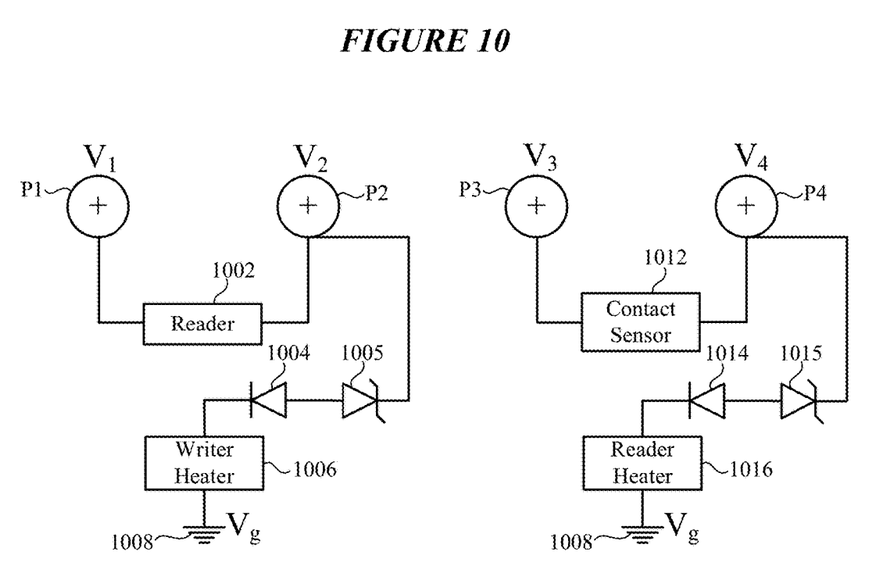
FIG. 10 illustrates circuitry configured to facilitate bond pad sharing between a multiplicity of components in accordance with various embodiments.

FIG. 10 illustrates circuitry configured to facilitate bond pad sharing between a multiplicity of components in accordance with various embodiments. In the embodiment shown in FIG. 10, the circuits of FIGS. 8B and 6B are configured for concurrent operation. In some operating scenarios, such as during contact detection, it may be desirable to have both the writer heater 1006 and the reader heater 1016 active at the same time. During contact detection, for example, the reader 1002 need not be active. However, the contact sensor 1012 is active concurrently with the writer heater 1006 and the reader heater 1016. It is noted that, for concurrent activation of the contact sensor 1012 and the reader heater 1016 shown in FIG. 6B, the voltage $V_4$ of bond pad P4 is greater than both the ground pad potential, $V_g$, and the voltage $V_3$ at bond pad P3.

Various embodiments are directed to an apparatus which includes a slider of a recording head comprising a plurality of electrical bond pads coupled to bias sources and a ground pad. Each of a plurality of electrical components of the slider is coupled to one of the electrical bond pads and to a ground pad of the slider. The slider includes a plurality of diodes, wherein at least one diode is coupled to the one electrical bond pad and a respective one of the plurality of electrical components. At least some of the diodes are arranged to conduct alternately depending on the polarity of the one electrical bond pad relative to the ground pad.

Figure 11A:
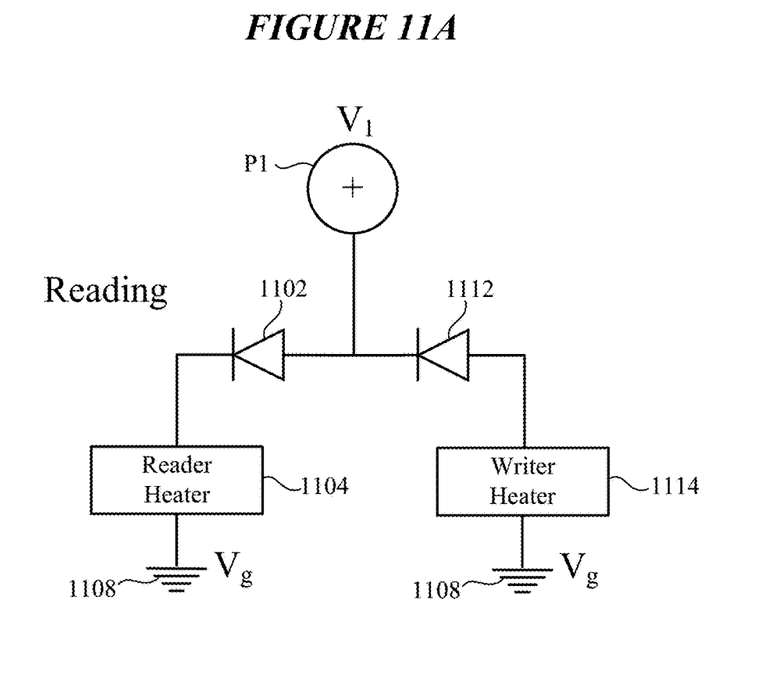
FIGS. 11A and 11B illustrate circuitry configured to facilitate bond pad sharing between a multiplicity of components using a single electrical bond pad in accordance with various embodiments.
Figure 11B:
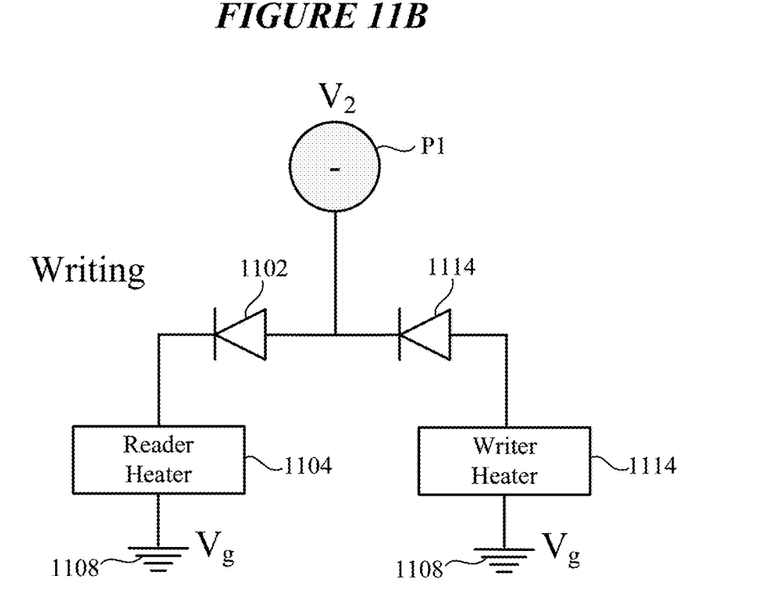

FIGS. 11A and 11B illustrate circuitry configured to facilitate bond pad sharing between a multiplicity of components using a single electrical bond pad in accordance with various embodiments. As a shown in FIG. 11A, a reader heater 1104 is coupled between a bond pad P1 and a ground pad 1008. A first diode 1102 is coupled between the reader heater 1104 and the bond pad P1, with the anode of the diode 1102 coupled to bond pad P1 and the cathode of the diode 1102 coupled to the reader heater 1104. The circuitry shown in FIG. 11A also includes a writer heater 1114 coupled between the bond pad P1 and the ground pad 1108. A second diode 1112 is coupled between the writer heater 1114 and the ground pad P1. The cathode of diode 1112 is coupled to the ground pad 1108 and the anode of the diode 1112 is coupled to the writer heater 1114. The circuitry shown in FIG. 11B is the same as that illustrated in FIG. 11A, except for the bias voltage supplied to the bond pad P1.

FIG. 11A shows the circuitry during a reading operation, while FIG. 11B shows the circuitry during a writing operation. In FIG. 11A, a positive voltage, $V_1$, is supplied to the bond pad P1 during the reading mode, in which current conducts through the diode 1102 thereby activating reader heater 1104. With the positive voltage, $V_1$, supplied to the bond pad P1, the diode 1112 is reversed biased, such that the writer heater 1114 is inactive. In FIG. 11B, a negative voltage, $V_2$, is supplied to the bond pad P1 during the writing mode, in which current conducts through the diode 1114 thereby activating the writer heater 1114. With the negative voltage, $V_2$, supplied to the bond pad P1, the diode 1102 is reversed biased, such that the reader heater 1104 is inactive. It is understood that other components can be incorporated in circuitry similar to that shown in FIGS. 11A and 11B, such that a single bond pad can provide bias power for a multiplicity of components of a recording head.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. An apparatus, comprising:
a slider of a recording head comprising a plurality of electrical bond pads coupled to bias sources and a ground pad;
a plurality of electrical components of the slider each coupled to at least one of the electrical bond pads;
at least one of the electrical bond pads is a shared electrical bond pad coupled to at least two of the electrical components;
a first electrical component is coupled between first and second electrical bond pads;
a second electrical component is coupled between the second electrical bond pad and a ground pad of the slider;
at least one diode is coupled to the second electrical bond pad and the second electrical component; and
the first and second components are energized alternately depending on the polarity of the first and second electrical bond pads.

2. The apparatus of claim 1, wherein:
the first electrical component is a thermal sensor; and
the second electrical component is a heater situated proximate a reader.

3. The apparatus of claim 1, wherein:
the first electrical component is a thermal sensor; and
the second electrical component is a heater situated proximate a writer.

4. The apparatus of claim 1, wherein:
the first electrical component is a reader of the slider; and
the second electrical component is a heater situated proximate a writer.

5. The apparatus of claim 1, wherein:
a reader is coupled between first and second electrical bond pads;
a heater situated proximate a writer is coupled between the second electrical bond pad and the ground pad of the slider;
a first diode is coupled to the second electrical bond pad and the writer heater;
a thermal sensor is coupled between third and fourth electrical bond pads;
a heater situated proximate a reader is coupled between the fourth electrical bond pad and a ground pad of the slider; and
a second diode is coupled to the fourth electrical bond pad and the reader heater.

6. The apparatus of claim 5, wherein:
the reader and the writer heater are energized alternately depending on the polarity of the first and second electrical bond pads; and
the thermal sensor and the reader heater are energized alternately depending on the polarity of the third and fourth electrical bond pads.

7. The apparatus of claim 5, wherein the writer heater and the reader heater are arranged to be energized concurrently.

8. The apparatus of claim 1, wherein:
at least the first and second electrical components are coupled in parallel between the first and second electrical bond pads.

9. The apparatus of claim 1, wherein:
the first electrical component and the second electrical components are coupled in parallel between the first electrical bond pad and the second electrical bond pad;

a first diode is coupled to the first electrical component;
a second diode is coupled to the second electrical component; and
the first and second diodes are arranged to conduct alternately depending on the polarity of the first and second electrical bond pads.

10. The apparatus of claim 1, wherein:
the first electrical component is a thermal sensor; and
the second electrical component is a bolometric sensor.

11. The apparatus of claim 1, further comprising a Zener diode coupled between the at least one diode and the second electrical bond pad.

12. An apparatus, comprising:
a slider of a heat-assisted magnetic recording head comprising:
a near-field transducer proximate an optical waveguide;
a reader and a writer, the writer situated proximate the near-field transducer;
a plurality of electrical bond pads coupled to bias sources and a ground pad;
a plurality of electrical components of the slider each coupled to at least one of the electrical bond pads;
at least one of the electrical bond pads is a shared electrical bond pad coupled to at least two of the electrical components;
a first electrical component is coupled between first and second electrical bond pads;
a second electrical component is coupled between the second electrical bond pad and a ground pad of the slider;
at least one diode is coupled to the second electrical bond pad and the second electrical component; and
the first and second components are energized alternately depending on the polarity of the first and second electrical bond pads.

13. The apparatus of claim 12, wherein:
the first electrical component is a thermal sensor; and
the second electrical component is one of a heater situated proximate the reader and a heater situated proximate the writer.

14. The apparatus of claim 12, wherein:
the first electrical component is a reader of the slider; and
the second electrical component is a heater situated proximate the writer.

15. The apparatus of claim 12, wherein:
at least the first and second electrical components are coupled in parallel between the first and second electrical bond pads.

16. The apparatus of claim 12, wherein:
the first electrical component and the second electrical component are coupled in parallel between the first electrical bond pad and the second electrical bond pad;
a first diode is coupled to the first electrical component;
a second diode is coupled to the second electrical component; and
the first and second diodes are arranged to conduct alternately depending on the polarity of the first and second electrical bond pads.

17. The apparatus of claim 16, wherein:
the first electrical component is a thermal sensor; and
the second electrical component is a bolometric sensor.

18. The apparatus of claim 12, further comprising a Zener diode coupled between the at least one diode and the second electrical bond pad.

* * * * *